United States Patent [19]

Myers et al.

[11] Patent Number: 5,499,755
[45] Date of Patent: Mar. 19, 1996

[54] PRECISION ALIGNMENT WELDING APPARATUS

[75] Inventors: John E. Myers, Sparks; Roy W. Procter, Reno, both of Nev.

[73] Assignee: Torque Converter Rebuilding Systems, Inc., Reno, Nev.

[21] Appl. No.: 379,145

[22] Filed: Jan. 27, 1995

Related U.S. Application Data

[63] Continuation of Ser. No. 870,015, Apr. 17, 1992, abandoned.

[51] Int. Cl.$^6$ .......................... B23K 37/04; B23K 37/053
[52] U.S. Cl. ........................... 228/44.3; 228/48; 219/159; 29/251; 29/252
[58] Field of Search ........................... 228/44.3, 48, 44.5, 228/212; 219/159; 29/238, 251, 252

[56] References Cited

U.S. PATENT DOCUMENTS

| | | | |
|---|---|---|---|
| 3,658,232 | 4/1972 | Dill | 228/48 |
| 4,116,375 | 9/1978 | Mozzhukhin et al. | 228/48 |
| 4,144,432 | 3/1979 | Mozzhukhin et al. | 219/159 |
| 4,196,840 | 4/1980 | McClure | 228/44.3 |
| 4,617,446 | 10/1986 | Anderson | 228/44.3 |

FOREIGN PATENT DOCUMENTS

| | | | |
|---|---|---|---|
| 138179 | 11/1960 | U.S.S.R. | 219/159 |
| 1637993 | 3/1991 | U.S.S.R. | 228/48 |

*Primary Examiner*—Samuel M. Heinrich
*Attorney, Agent, or Firm*—Bielen, Peterson & Lampe

[57] ABSTRACT

A precision alignment apparatus that automatically welds together the parts of a cut-apart torque converter. A precision cast and machined frame is provided onto which are mounted a spindle assembly, a double-end air cylinder and a turntable which are aligned within a close tolerance along a longitudinal axis. The spindle assembly grabs and aligns the upper half of the torque converter. The double-end air cylinder moves the spindle assembly along the longitudinal axis and provides for the longitudinal alignment of the torque converter parts. The turntable supports and aligns the lower torque converter half. The apparatus provides for automatic welding of the first part to the second part while alignment is maintained by the spindle assembly and the turntable. During welding the turntable and the spindle assembly rotate about the longitudinal axis to move the torque converter past the stationary welding device.

11 Claims, 8 Drawing Sheets

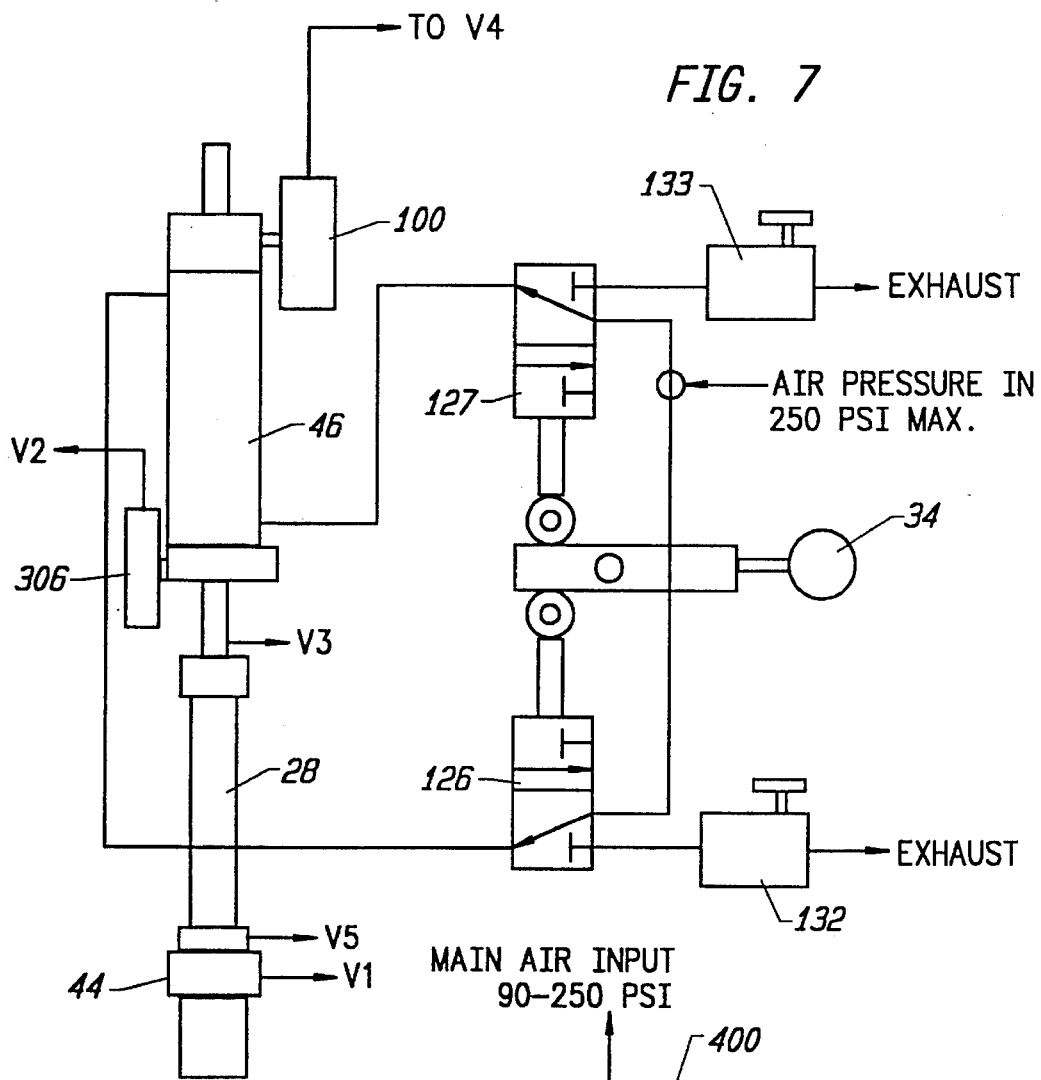

PRECISION ALIGNMENT WELDING APPARATUS

This is a continuation of application Ser. No. 07/870,015, filed 17 Apr. 1992, now abandoned.

BACKGROUND OF THE INVENTION

This invention relates to an apparatus and method for precisely aligning and welding the parts of a torque converter that has been cut apart and rebuilt.

In the field of transmission repairs it is common that torque converters must be rebuilt because they become worn or clogged with metal shavings and other impurities that enter the torque converter from the transmission. A torque converter is rebuilt by cutting open its metal casing into two approximate halves and replacing the worn portions of the internal mechanism. The rebuilt torque converter is reassembled by aligning the halves of the torque converter and welding them together. It is critical that the halves of the torque converter are joined with the proper spacing and are perfectly aligned radially.

SUMMARY OF THE INVENTION

The present invention provides an apparatus and a method to precisely align the parts of a cut-apart torque converter casing so that the parts may be welded together. The apparatus has a one-piece cast frame that is precision machined. A turntable is mounted onto the frame and a motor is connected to the turntable to rotate the turntable during the welding of the torque converter. An elongate spindle assembly mounted into the frame attaches to the upper half of the torque converter casing by means of a collet that precisely aligns the upper half of the torque converter casing with the lower half of the casing which is positioned on the turntable. The spindle assembly moves longitudinally by means of a double-end air cylinder and a manually operated micrometer adjustment. The spindle assembly includes a hold-down mechanism which presses against the lower half of the torque converter casing to hold it securely in position on the turntable. After the torque converter has been installed onto the apparatus and aligned, the apparatus may be activated to automatically weld the torque converter parts together.

It is a primary object of the present invention to provide an apparatus that precisely aligns the parts of a cut-apart torque converter and maintains precision alignment during an automatic welding sequence.

It is a further object of the present invention to provide an automatic welding machine for aligning the parts of a cut-apart torque converter incorporating the improvement of a double-end air cylinder which provides very precise and smooth longitudinal motion to an elongate alignment shaft so that the shaft may be precisely and conveniently controlled by a machine operator to align the cut-apart halves of the torque converter prior to welding.

It is a further object of the present invention to provide a movable collet mechanism that securely attaches to a hub of a torque converter in a manner that aligns the torque converter in a plane that is perpendicular to the axis of movement of the collet so that the torque converter parts may be precisely aligned prior to welding.

It is a further object of the present invention to provide a method of mounting the parts of a cut-apart torque converter onto an apparatus and thereafter precisely aligning the parts and automatically welding the halves together.

The foregoing and other objectives, features and advantages of the present invention will be more readily understood upon consideration of the following detailed description of the invention taken in conjunction with the accompanying drawings.

BRIEF DESCRIPTION OF THE DRAWINGS

FIG. 7 is a logic diagram showing the pneumatic lines incorporated in the apparatus of FIG. 1.

FIG. 8 is a logic diagram of the pneumatic lines going to the control valves used to regulate the supply of pressurized air to the pneumatic devices of the apparatus of FIG. 1.

DETAILED DESCRIPTION OF THE INVENTION

Figure 1:
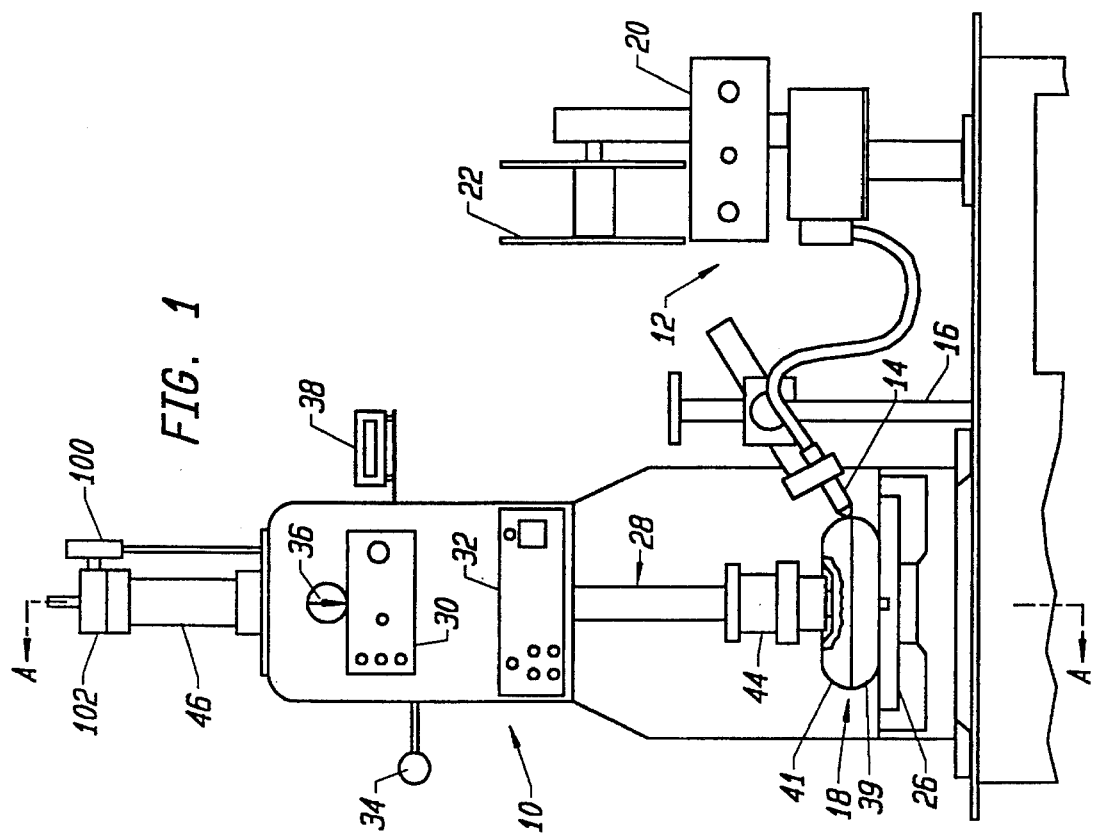
FIG. 1 is a front elevational view of a preferred embodiment of an apparatus of the present invention that aligns the parts of a cut-apart torque converter and automatically welds the parts together while maintaining them in alignment.

FIG. 1 shows an exemplary embodiment of the present invention illustrating how all components work together to provide an apparatus for aligning the parts of a cut-apart torque converter and welding them together. Precision alignment welding apparatus 10 includes a welding device 12 with a welding gun 14 and a stand 16 that supports the welding gun and permits the welding gun to be positioned for welding a torque converter 18. A motorized turntable 26 rotates the torque converter during welding. Also shown is a wire feeder 20 that feeds flux wire from the spool 22 to the weld location near the torque converter. The welding apparatus 10 consists of a frame 24, the turntable 26, a spindle assembly 28, control panels 30 and 32, a spindle control lever 34, a micrometer control knob 36 and a double-end air cylinder 46. Also shown is a micrometer read-out 38.

Figure 2:
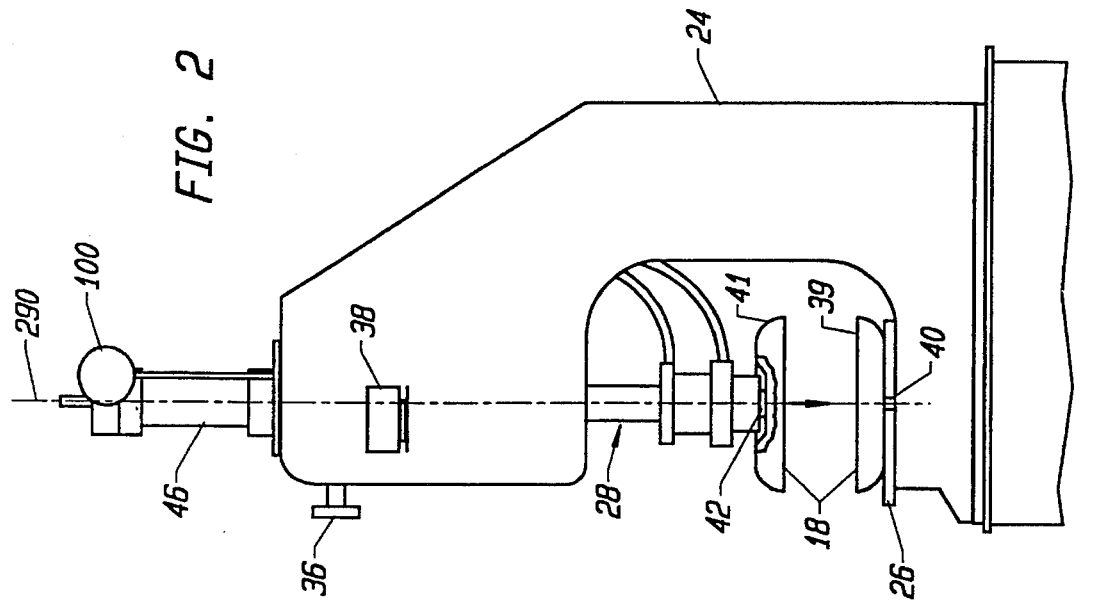
FIG. 2 is a side elevational view of the apparatus of FIG. 1.

FIG. 2 is a side view of the invention shown in FIG. 1 in which the torque converter 18 parts are shown separated. For purposes of this description, the portion of the torque converter resting on the turntable will be referred to as the lower half 39 and the raised portion attached to the end of the spindle assembly 28 is the upper half 41. The lower half has a central pilot hub 40 and the upper half has a central pump hub 41. The hubs 39, 41 are used to align the halves of the torque converter.

The invention may be explained by first describing the basic operation of the welding apparatus with reference to FIGS. 1 and 2. Starting with a torque converter 18 that has been cut apart and rebuilt, an operator selects a pilot hub bushing 246 and a collet bushing 257 (FIG. 5) that fit onto the pilot hub 40 and pump hub 42 respectively. The pilot hub bushing is set into a well 43 centered in the turntable and both halves of the torque converter are set onto the turntable with the pilot hub 40 sitting in the pilot hub bushing 246. This has the effect of centering the torque converter the turntable. At this point the spindle assembly 28 is in a raised position above the turntable and torque converter. Next, the operator operates the spindle control lever 34 to lower the spindle assembly 28 over the pump hub 42 on the upper half of the torque converter and then connects the spindle assembly to the pump hub. After the spindle assembly has been clamped onto the pump hub and the vertical clearance between the halves has been adjusted along a longitudinal axis 290, the turntable 26 is rotated and the welding apparatus 12 is activated to weld the halves of the torque converter together.

The preceding basic description of the operation was provided as a framework for understanding the detailed description of the components which follow and was not intended to act as a limitation upon the detailed description of the operation which follows the descriptions of the components.

The Double-end Air Cylinder

The spindle assembly 28 is raised and lowered by a double-end air cylinder that is uniquely plumbed to provide very smooth and precise movement of the spindle assembly along the longitudinal axis 290.

Figure 9:
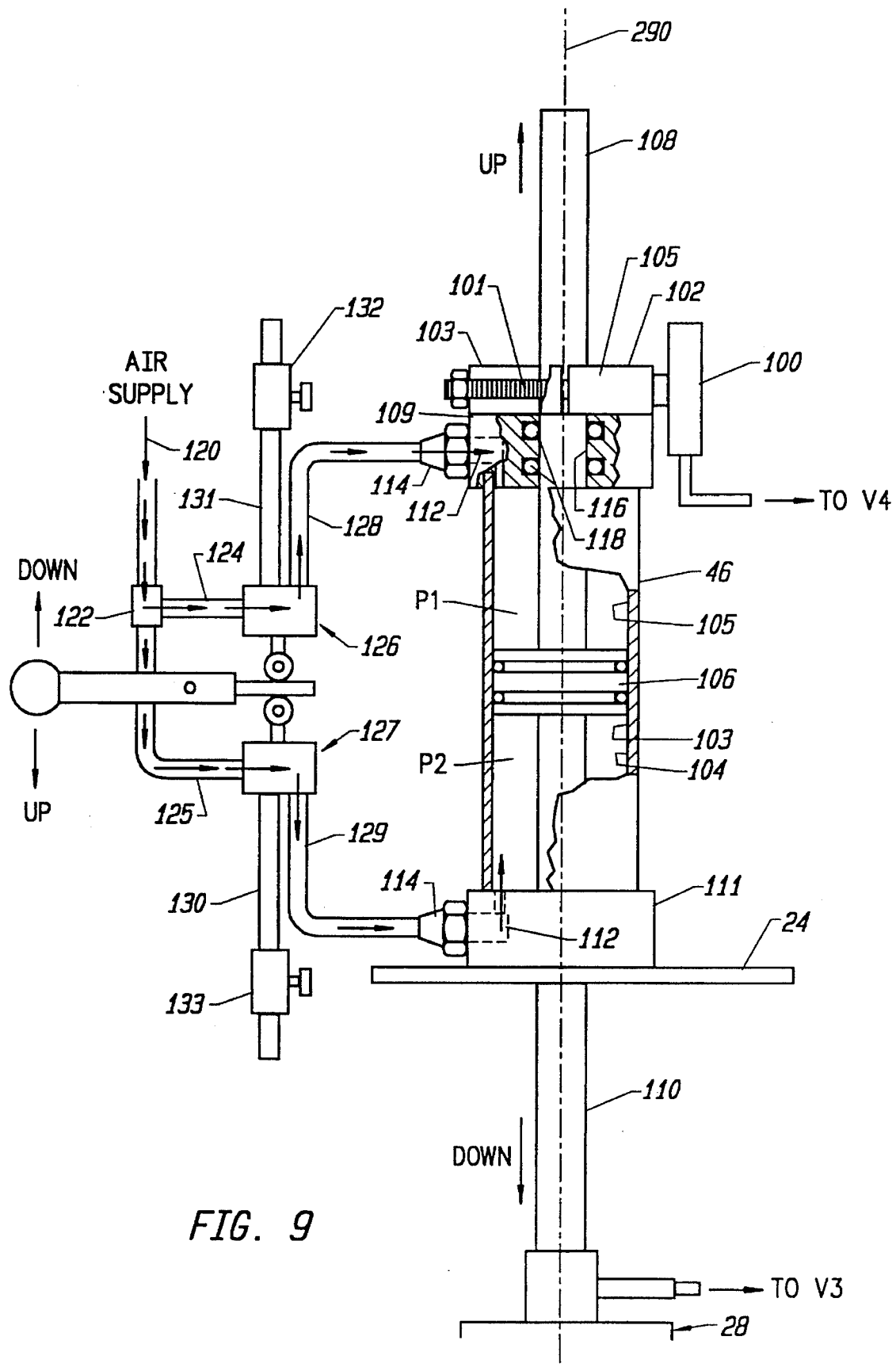
FIG. 9 is a partial schematic of the air lines and a partial cross-sectional view of a double-end cylinder that is a component of the apparatus of FIG. 1 in neutral position.
Figure 10:
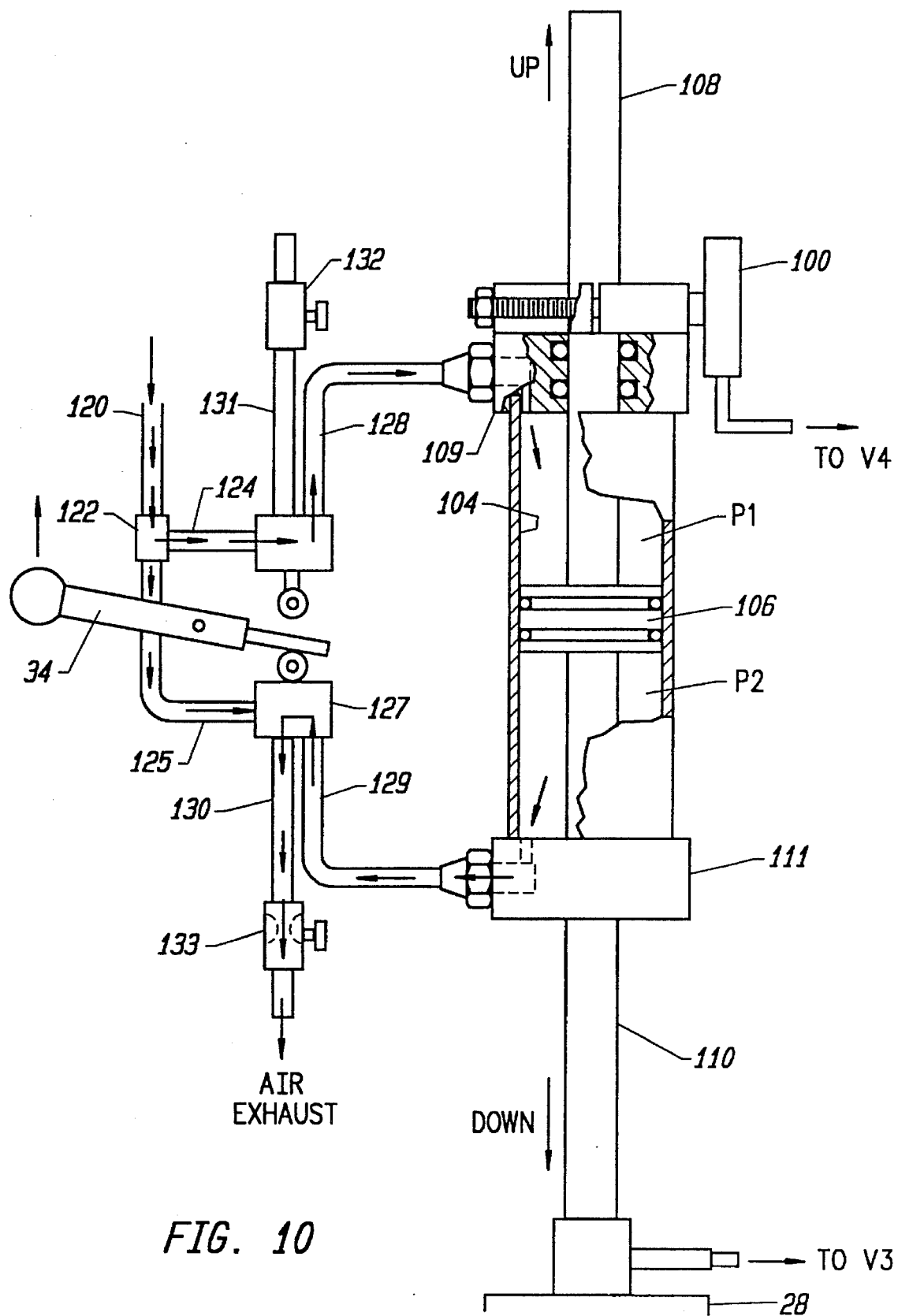
FIG. 10 shows the components of FIG. 9 in an activated state.

The double-end air cylinder 46 is shown in FIGS. 9 and 10. A commercially available double-end air cylinder consists of a tube-cylinder 104 having an upper chamber 105 and a lower chamber 103, above and below the piston 106, respectively, with sealed ends 109, 111 and a piston 106 located in the tube-cylinder. The piston is connected to an upper rod 108 and a lower rod 110 extending outward from opposite sides of the piston and protruding through the end caps 109, 111 of the tube-cylinder 104. Each end cap 109, 111 seals an end of the tube and further provides an air inlet duct 112 which leads from an air tube fitting 114 into the interior of the tube-cylinder. In addition, each end cap provides a rod opening 116 having O-ring seals 118 to provide an airtight seal between the end cap and the rod so that air pressurized within the tube-cylinder 104 does not escape out the end caps 109 and 111.

Air pressure is supplied to the double-end cylinder by means of an air supply that enters the pneumatic system at 120 and flows through a tube to the tee 122 where the airflow and pressure is divided into two legs 124 and 125. Following the upper portion of the pneumatic system that flows through leg 124, it may be seen that the air enters a three-way valve 126 and exits into an upper air tube 128 that is attached to the air tube fitting 114 that is connected to the upper end cap 109. The lower portion of the pneumatic system is symmetrical to the upper portion.

FIG. 9 illustrates the system when the spindle control lever 34 is in the neutral position. When the lever 34 is in its neutral position both three-way valves are in their flow-through condition allowing pressurized air from the air supply to pass through the three-way valves and enter the upper air tube 128 or lower air tube 129, and flow into the tube-cylinder 104 in equal proportions in the upper chamber 105 and lower chamber 103. Thus, as shown in FIG. 9, pressure at points P1 and P2 are equal creating equal pressure on the lower and upper faces of the piston 106 keeping the piston stationary.

FIG. 10 shows the spindle control lever when it has been pushed upward to actuate the lower three-way valve 127 by closing off the lower air supply line 125 and creating a flow-through between the lower air tube 129 and the lower exhaust line 130. The upper three-way valve 126 is unaffected and air pressure continues unabated between the air pressure inlet at 120 and the upper chamber 105. Since the lower chamber 103 is vented to the atmosphere and the upper chamber 105 is still connected to the air supply line the relative pressures P1 in the upper cylinder and P2 in the lower cylinder are now unequal. P1 is greater than P2 and the piston 106 is moved downward toward the lower pressure. Because the piston 106 is connected to the lower rod 110 which is connected to the spindle assembly 28, the spindle assembly is moved smoothly downward along the longitudinal axis 290.

The use of two-way pneumatic cylinders as a means to create linear motion is not new. A typical application might use a two-way pneumatic cylinder by pressuring one or the other chamber when linear motion is desired and when it is desired to keep the piston stationary neither chamber will receive pressurized air. When used in this manner the piston begins its motion with a quick jerking motion because the static friction of the piston against the interior surface of its cylinder is greater than the dynamic friction. Therefore, greater pressure is needed to begin motion of the piston than is needed to continue motion. Such jerking motion would be unacceptable for use in the present invention because the present invention requires precision movement and adjustment so that the halves of the torque converter are not damaged when moving the collet into position and to insure that the clearance between the two halves is maintained precisely aligned during welding.

The present invention solves the problem of the jerking motion associated with the high pressure necessary to overcome the static friction, by continuously maintaining a high pressure in both chambers 103, 105 that is sufficient to overcome the static friction. The piston is then moved by bleeding off pressure from one of the chambers thereby imparting a very smooth movement to the piston 106 that may be precisely controlled. This precise control is the result of two three-way valves 126, 127 that permit the system to pressurize both chambers and controllably bleed off pressure from one or the other chambers so that the piston movement is smooth, even from a dormant position.

The rate of travel of the piston is controlled by the degree to which the operator deflects the spindle control lever 34. If the operator pushes on the spindle control lever 34 a small amount then only a small amount of air will vent out of the system through one of the exhaust lines 130 or 131. Conversely, if the operator deflects the spindle control lever 34 a greater amount, more air will exhaust from the system and the piston will move more rapidly. The maximum rate of piston movement may be controlled by flow regulators 132 and 133 which regulate the volume of air that may be exhausted when the three-way valves 126, 127 are fully open.

The longitudinal position of the elongated spindle assembly 28 may be locked into position by a spindle clamp 102. Clamp 102 is a two-piece device that surrounds the upper rod 108, and when the two pieces 103 and 105 are pinched together they clamp down on the rod 108. Clamp 102 is connected to a spindle lock 100 which is an air servo that is pneumatically connected to valve V4. When valve V4 is actuated, pressurized air enters the spindle lock 100 which pulls on a clamp bolt 101 pinching the two pieces 103 and 105 of the clamp 102 together thereby clamping onto the upper rod 108 and immediately arresting the motion of the spindle assembly 28.

The Collet

Figure 4:
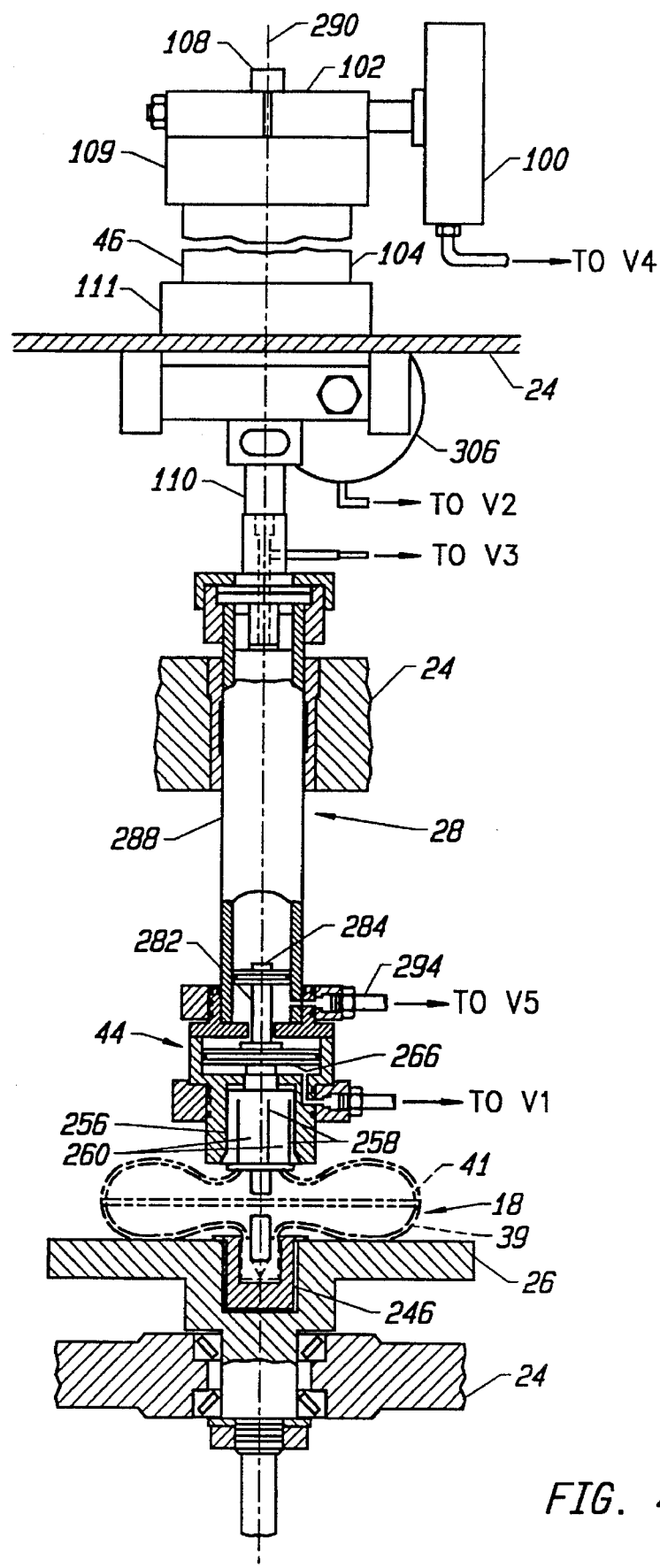
FIG. 4 is a partial cross-sectional view of the spindle assembly of the apparatus of FIG. 1 taken along the line A—A of FIG. 1.
Figure 5:
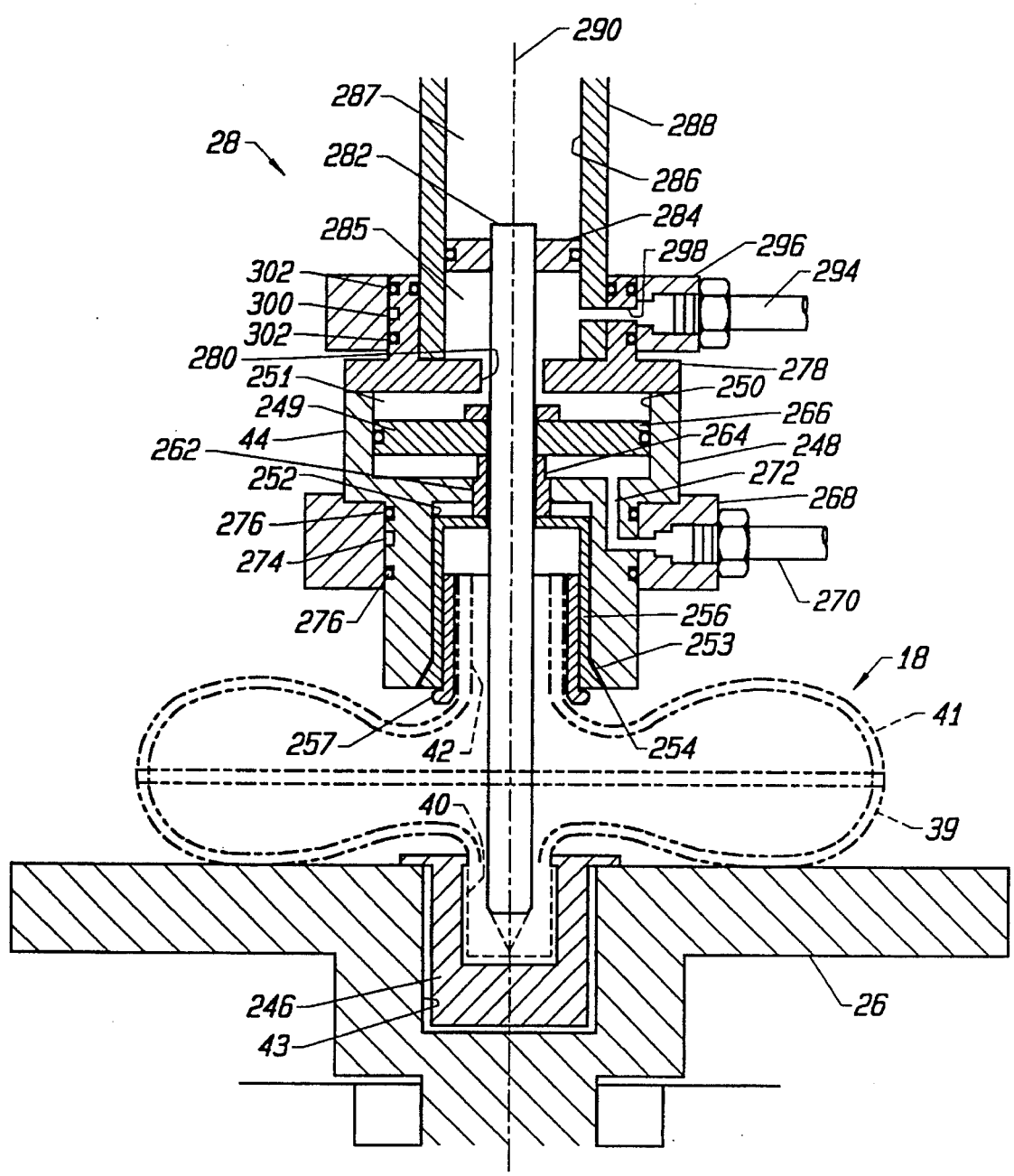
FIG. 5 is a cross-sectional view showing more detail of the collet assembly shown in FIG. 4.

Referring to FIGS. 4 and 5, the upper half 41 of the torque converter 18 is connected to the spindle assembly 28 by the collet 44. The collet's unique gripping mechanism precisely aligns the upper half 41 in the plane that is perpendicular to the longitudinal axis 290 of the spindle assembly. Moreover, the upper half 41 is radially aligned or centered with respect to the lower half 39 by the collet 44.

Turning now to FIG. 5 the collet 44 has a housing 248 that defines a collet cylinder 250, having a lower portion 249 that is below a collet piston 266 and an upper portion 251 above the collet piston 266. The collet housing 248 also defines a collet closure cavity 252 which accepts a collet closure 256—a bell-shaped steel member having slits 258 (FIG. 4) cut from the bottom edge of the collet closure 256 and extending most of the way up the collet closure 256 so as to form gripping tangs 260. The collet closure cavity 252 is in communication with the piston cylinder 250 by means of an opening 262 that accepts a hollow shaft 264 connected to the collet piston 266. The collet cylinder 250 is pneumatically sealed from the closure cavity 252. An air swivel collar 268 is disposed externally about the collet housing 248. A collet air supply line 270 connects to the air swivel collar 268 and is in communication with the collet cylinder 250 via air supply conduit 272.

When the lower chamber 249 of the collet cylinder 250 is pressurized, the pressure on the underside of the collet piston 266 raises the collet closure 256 up into the collet closure cavity 252. The lower rim of the collet closure 256 includes a thickened lip 253, which surface resembles the surface of a frusto-conical cone. As the collet closure is raised, the thickened lip of the collet closure 256 is engaged by the tapered opening 254 of the collet closure cavity 252 squeezing the gripping tangs 260 of the collet closure 256 around the hollow cylindrical collet bushing 257 fitted around the pump hub 42 of the torque converter 18. Thus, raising the collet closure grips the upper half 41 of the torque converter 18 and aligns it with the lower half 39 about the longitudinal axis 290.

The spindle assembly 28 (with the collet 44) is a rotating body, but the air supply line 270 and the air swivel collar 268 are stationary. It is necessary, however, that the air supply line 270 be in constant communication with the lower portion 249 of the collet cylinder 250. This is accomplished by providing an annular groove 274 about the circumference of the lower collet housing 248. The lower collet housing 248 also includes two O-ring seals 276 that prevent air leakage from the air swivel collar. When pressurized air is supplied to the air supply line 270 it enters the circumferential groove 274 and flows into the conduit 272 supplying pressurized air to the lower chamber of the collet cylinder 249 thereby urging the collet piston 266 upward. The piston 266 is fixedly attached to the piston shaft 264 which in turn is fixedly attached to the collet closure 256. Thus, as the collet piston 266 is urged upward so too are the piston shaft 264 and the collet closure 256.

At the top of the collet housing 248 is an end cap 278 which is bolted to the collet housing 248 (bolts not shown). The end cap 278 defines the top of the collet cylinder 250. Furthermore, the end cap 278 has an opening 280 that accommodates a hold-down shaft 282 that is attached to a hold-down piston 284. The end cap opening 280 is oversized beyond the diameter of the hold-down shaft 282 which passes through the opening so that the lower portion 285 of the hold-down cylinder 286 and the upper portion of the collet cylinder 251 are in pneumatic communication.

The purpose of hold-down piston 284 and shaft 282 is to press down on the inside of the pilot hub 40 of the torque converter 18 to keep the lower half 39 of the torque converter in place during welding. The hold-down piston 284 is contained within a hold-down cylinder 286 defined by the hollow center of the tube-like spindle 288. The hold-down cylinder 286 has a lower portion 285 below the hold-down piston 284 and an upper portion 287 above the piston. The hold-down shaft extends through the opening 280 in the collet cylinder end cap 278, through an opening in the center of the collet piston 266, through the collet piston shaft 264, and through the collet closure 256 into an opening in the pump hub 42 and completely through the torque converter to the inside bottom of the pilot hub 40. The upper portion of the hold down cylinder 287 is pressurized by actuating V3 (FIG. 4) urging the hold-down piston 284 and shaft 282 downward. Air is supplied to the upper chamber of hold-down cylinder 287 before the torque converter is welded. When the upper chamber of the hold-down cylinder is pressurized the hold-down shaft maintains pressure against the lower half 39 of the torque converter 18 while the spindle assembly is adjusted. The pressure of the hold-down shaft 282 is due to the air pressure in the upper portion 287 of the hold-down cylinder 286 and thus it is constant even while the spindle assembly 28 moves along the longitudinal axis.

After welding is complete the pressure above the hold-down piston 284 is relieved and air pressure is supplied to the lower portion 285 of the hold-down cylinder 286 via release air line 294 thereby raising the hold-down piston 284 and relieving pressure on the torque converter 18. Additionally, because the lower portion 285 of hold-down cylinder 286 is in communication with the top portion 251 of the collet piston cylinder 250 via the oversized opening 280, the top portion 251 of the collet piston cylinder 250 is simultaneously pressurized urging the collet piston 266 downward thereby releasing the grip of the collet closure 256 the pump hub 42 of the torque converter 18.

The release hold-down air supply line 294 is connected to a hold-down air swivel 296 which is disposed about the collet end cap 278. The collet end cap 278 and the spindle 288 define a hold-down air conduit 298 that permits the release air line 294 to be in pneumatic communication with the lower portion 285 of the hold-down cylinder 286 and the upper portion 251 of the collet cylinder 250. The portions of the hold-down air conduit 298 which pass through the collet end cap 278 and the spindle 288 are always aligned because the collet end cap 278 is fixedly attached to the spindle 288.

As previously stated with regard to the collet air swivel 268, the spindle assembly 28 rotates when the torque converter is being welded but the release air line 294 and the hold-down air swivel collar 296 remain stationary. During spindle assembly 28 rotation air is delivered to the hold-down air conduit 298 by an air supply groove 300 defined on an outer periphery of the end cap 278. O-rings 302 ensure an airtight seal between the rotating end cap 278 and the stationary air swivel collar 296.

The Frame

Figure 6:
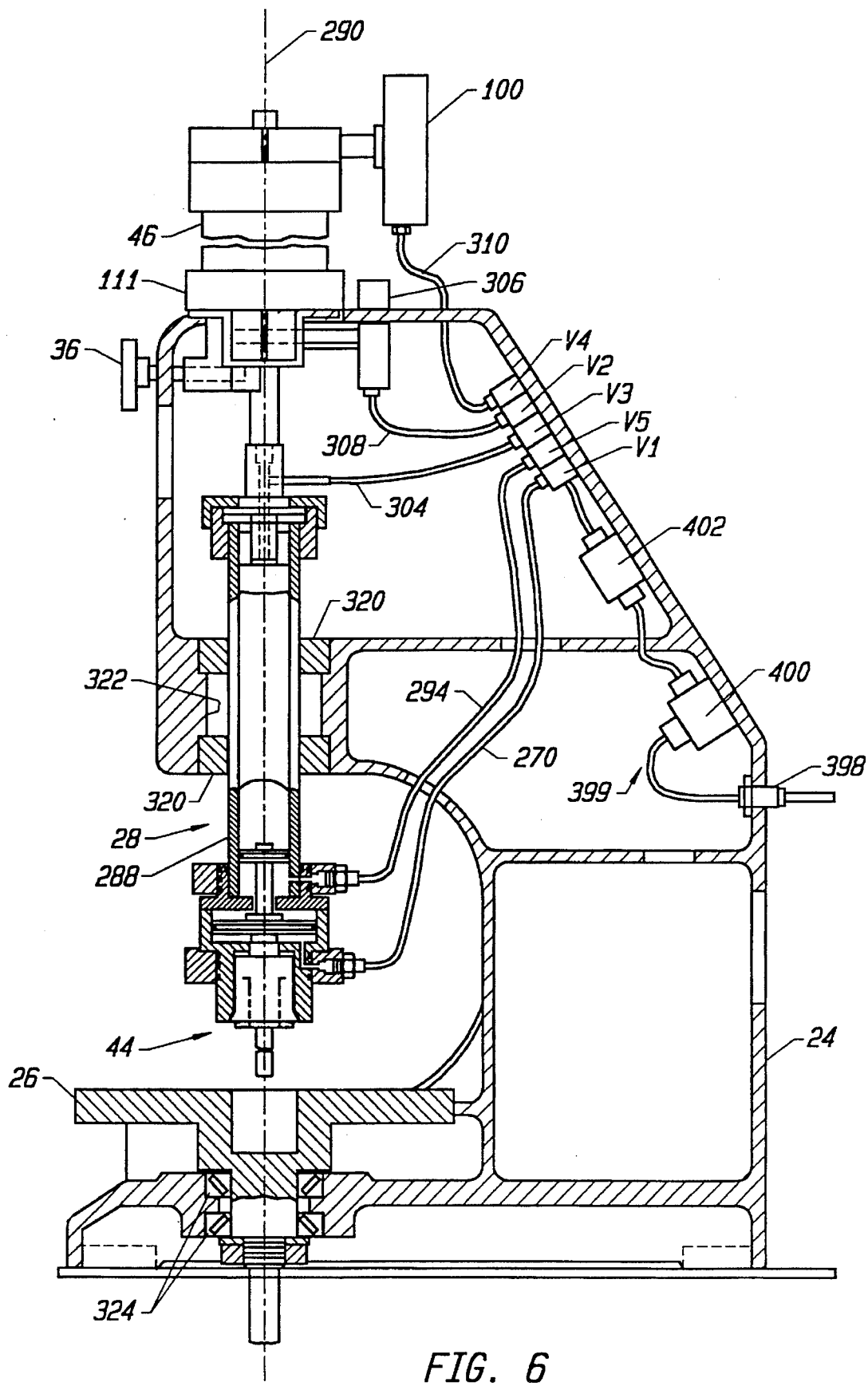
FIG. 6 is a partial cross-sectional view taken along line A—A in FIG. 1.

All components of this welding apparatus are mounted onto the unicast frame 24 which is shown in FIG. 6. The frame 24 is the primary platform upon which the essential components of the present invention are mounted. The frame 24 is a critical item because the components of the welding system must be mounted in perfect longitudinal alignment along axis 290 in order to ensure that the halves 39, 41 of the torque converter 18 are perfectly aligned prior to their being welded together. As can be seen in FIG. 6 the spindle assembly 28 depends entirely upon the frame 24 for its alignment with the turntable 26. And because the lower half 39 of the torque converter is held in position by the pilot bushing 246 and turntable 26, and the upper half 41 of the torque converter 18 is aligned by its connection with the spindle assembly 28 and collet 44, it is therefore critical that the openings in the frame 24 for mounting these items are in precise alignment.

The spindle assembly 28 is mounted onto the frame 24 by a combination of thrust and roller bearings 320. After the frame 24 is cast the spindle opening 322 is precision machined and the spindle 288 and bearings 320 are mounted onto the frame 24. Non-adjustable mounts are used to ensure that the spindle 288 stays in perpetual alignment. Therefore, the precision casting and machining are relied upon to provide the necessary alignment.

The turntable 26 is mounted to the frame 24 on tapered roller bearings 324. As with the spindle 288, the turntable position is not adjustable 26. Thus, the alignment is achieved solely by proper machining.

The double-end air cylinder 46 is bolted to the frame 24 at its lower end cap 111. The mounting bolts are not adjustable. Alignment is achieved by proper machining.

Non-adjustable mounting bearings and bolts provide superior alignment reliability as compared to adjustable alignment devices. However, non-adjustable mounts impose a burden on the manufacturer to produce a precision machined frame. Non-adjustable mounts also impose a quality control burden on the manufacturer because each welding apparatus must be within tolerance when it leaves the manufacturer since the customer is not able to adjust the alignment.

System Operation

The present invention provides a means and a method to precisely align the parts of a cut-apart torque converter 18 prior to welding the parts together. The parts must be aligned along a longitudinal axis 290 and they must be radially aligned on a plane perpendicular to the longitudinal axis 298. The elements that most affect the precision alignment are the frame 24, the double-end air cylinder 46, the collet 44 and the turntable 26. The system operation will now be described beginning with a description of the pneumatic lines as shown in FIGS. 6, 7 and 8.

Pressurized air is used to operate all of the moving components of the welding apparatus of the present invention with the exception of the turntable 26 which is driven by an electric motor (not shown). An air supply on the order of 90–150 psi is attached to a hose connector 398 mounted on the frame 24. The air lines 399 proceed from the hose connector 398 to a filter regulator 400 and then to an in-line oiler 402 after which they proceed to five electrically operated valves V1–V5. Air lines proceed from the valves V1–V5 to pneumatic devices that operate the welding apparatus. With particular reference to FIGS. 6 and 7 it is seen that valve V1 supplies air pressure to the collet 44 via air supply line 270. Valve V5 supplies air pressure to the release hold-down air supply line 294, and valve V3 supplies air pressure to an upper hold-down air supply line 304. Valve V2 supplies air pressure to the micrometer clamp 306 via the clamp air supply line 308. Valve V4 supplies pressurized air to the spindle lock 100 via spindle lock air supply line 310. The system operation will now be described with particular reference to the pneumatic devices and controls.

Figure 3:
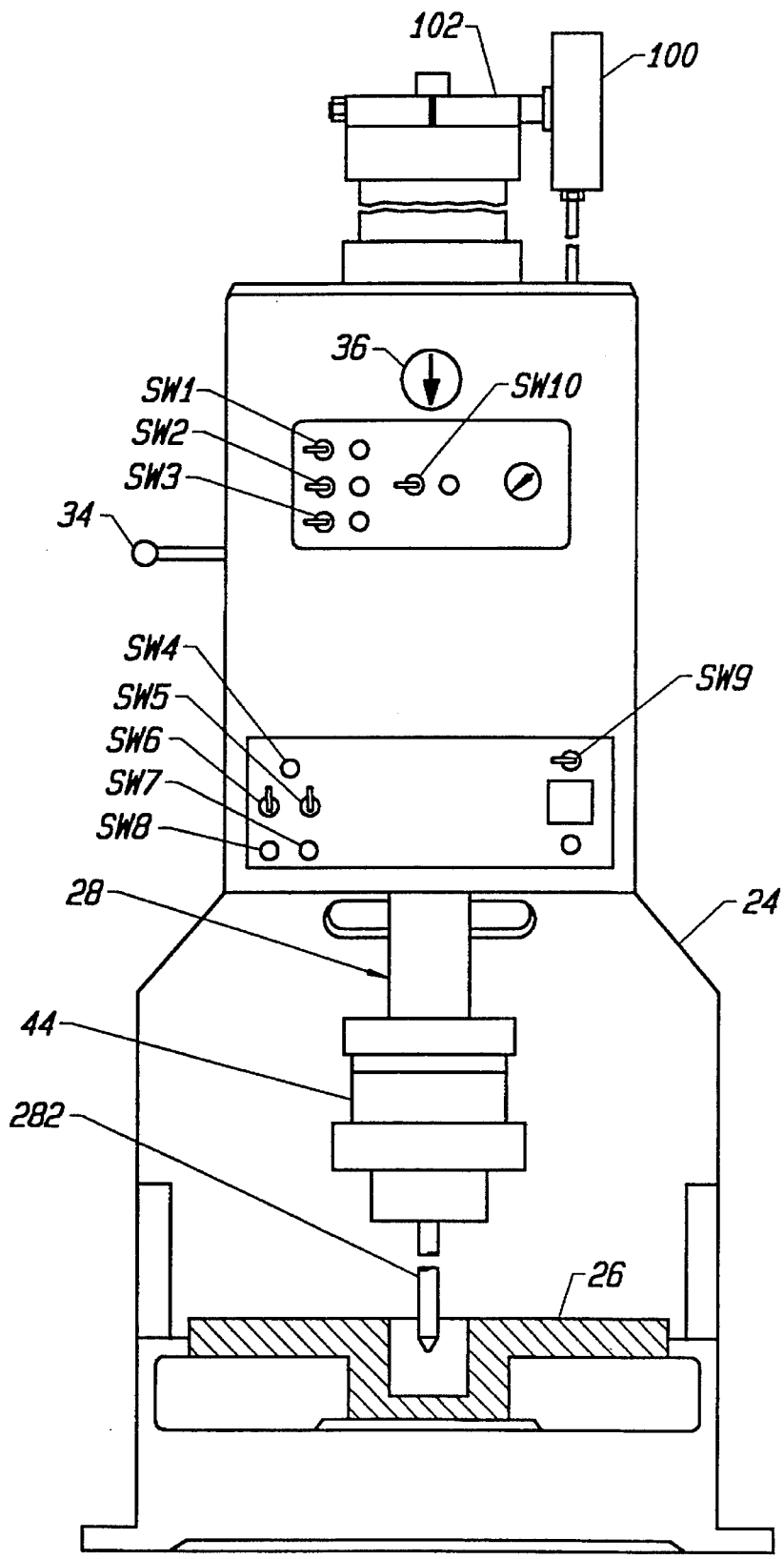
FIG. 3 is a front elevational view of the apparatus of FIG. 1 particularly showing the control panels and indicator lights.

A human operator turns on the precision alignment welding apparatus by actuating switch SW9 (FIG. 3) and then the operator will identify a torque converter that has been rebuilt and needs to be welded together. Once identified, the operator will select a properly sized DELRON® collet bushing 257 and steel pilot bushing 246. Both the pilot bushing 246 and the collet bushing 257 are provided in a series of sizes to accommodate a variety of different torque converters. All bushings have identical outside diameters to interface properly with the welding apparatus 12 of the present invention. But the inside diameters of the bushings are sized to a particular torque converter. Obviously, since the outside diameter is constant and the inside diameter changes to accommodate different torque converters, the wall thickness varies among the different bushings.

The pilot bushing 246 is inserted into the well 43 in the turntable 26 center and the torque converter 18 is seated firmly on the turntable 26 with the pilot hub 40 oriented downward and seated in the pilot bushing 246. This centers the lower half 39 with respect to the longitudinal axis 290. At this point the upper half 41 of the torque converter 18 is resting on the lower half 39 of the torque converter. The operator actuates the spindle control lever 34 to smoothly and precisely lower the spindle assembly 28 until the collet 44 envelopes approximately two-thirds of the pump hub 42. The operator then releases the spindle control lever 34 to stop the downward motion of the spindle assembly 28 and turns on switch SW1 to electrically activate valve V1 to supply air pressure to the collet 44 via the supply line 270. Pressurized air then fills the lower portion 249 of the collet cylinder 250 urging the collet piston 266 upwardly and pulling the collet closure 256 up which constricts the tangs 260 as the collet closure 252 enters the collet closure cavity 252, thereby grasping onto the pump hub 42. This means of attaching the pump hub to the spindle 288 ensures extremely precise alignment of the torque converter halves 39, 41 due to the precision alignment of the spindle 288 and turntable 26 about the longitudinal axis 290. At this point the two-halves 39, 41 of the torque converter 18 are still in contact with one another. The operator then sets the micrometer readout 38 to zero and turns on the clamp switch SW2 which electrically activates valve V2 and supplies air pressure to micrometer clamp 306 which locks the micrometer adjustment knob 36 onto the lower rod 110 of the double-end cylinder 46.

Next, the operator moves the hold-down switch SW3 to the "HOLD-DOWN" position which activates valve V3 to supply pressurized air to the upper hold-down air supply line 304 which pressurizes the upper portion of the hold-down piston cylinder 287. The hold-down piston 284 is urged downwardly, pushing down the hold-down shaft 282 which presses down upon the inside bottom of the pilot hub 40. Thus the bottom portion of the torque converter at the pilot hub is held firmly held in place. The hold-down shaft will maintain this pressure on the pilot hub independent of subsequent movement of the spindle assembly 28.

The operator may now turn the micrometer adjustment knob 36 to precisely control the longitudinal movement of the spindle assembly 28 so that the halves 39, 41 of the torque converter may be precisely aligned along the longitudinal axis. Movement along the longitudinal axis is indicated on the micrometer readout 38 so that the operator is able to precisely control the longitudinal separation between the torque converter halves 39, 41. This longitudinal adjustment is essential to a properly working torque converter 18. When the proper clearance between the halves 39, 41 of the torque converter 18 is achieved, as indicated by the micrometer readout 38, the operator stops turning the micrometer adjustment knob 36 and activates switch SW10 which electrically opens valve V4 to supply pressurized air to the spindle lock 100. This pneumatically operates the spindle clamp 102 which constricts about the upper rod 108 to lock the rod 108 into position, restricting all further longitudinal movement of the spindle assembly 28.

The operator then turns on the appropriate switches to begin the automatic weld cycle. The apparatus will automatically weld the halves of the torque converter together and then stop.

After welding, the operator turns off the spindle lock switch SW10 which closes valve V4 and ends the pressurized air supply to the spindle lock 100. The operator turns off the hold-down switch SW3 ending the supply of pressurized air to the upper portion 287 of the hold-down cylinder 286. The operator turns off SW2 ending the supply of pressurized air to the clamp 306 thereby taking the micrometer adjustment off the spindle assembly. The operator then returns the micrometer adjustment knob to the zero position. Next, the operator turns off the collet switch SW1 ending the supply of pressurized air to the collet piston cylinder 250 and moves the hold-down switch SW3 to the "RELEASE" position which activates valve V5 and supplies pressurized air to the release air supply line 294 which pressurizes the lower portion of the hold-down cylinder 285 and the upper portion of the collet cylinder 251 as previously explained. Thus, the hold-down piston moves upward and the collet piston moves downward simultaneously raising the hold-down shaft 282 and releasing the collet's 44 grip on the pump hub 42. The operator then activates the spindle control lever 34 to raise the spindle assembly 28. The operator is now free to remove the welded torque converter 18 from the turntable and begin the process over again with the next cut-apart torque converter.

The remaining switches SW4–SW8 control various aspects of the welding process and are not relevant to the alignment of the torque converter halves 39, 41.

The terms and expressions which have been employed in the foregoing specification are used therein as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. An apparatus for gripping and precision aligning of first and second parts of a separated torque converter, comprising:
    a. a platform for supporting the first and second parts of a separated torque converter;
    b. a collet closure including an opening therethrough terminating, in an open end which at least partially surrounds the first part of the separated torque converter;
    c. constricting means for forcing said collet closure into engagement with the first part of the separated torque converter;
    d. a shaft extending through said opening of said collet closure;
    e. holding means for forcing said shaft into engagement with the second part of the separated torque converter, said second part of said separated torque converter being supported by said platform relative to an axis; and
    f. alignment means for moving the first part of the separated torque converter relative to said axis and into contact with the second part of the separated torque converter.

2. The apparatus of claim 1 which additionally comprises a housing that defines a cavity which at least partially surrounds said collet closure, and said constricting means includes means for forcing said housing against said collet to cause gripping of said collet closure about the first part of the separated torque converter.

3. The apparatus of claim 2 in which the collet further includes a plurality of slits extending to said open end thereof.

4. The apparatus of claim 2 in which said constricting means further comprises:
    a. a piston disposed within a piston chamber, said piston being movable relative to said axis;
    b. a piston shaft connected to the piston and extending outwardly from the piston chamber, said piston shaft being connected to said collet closure;
    c. control means for providing a pressurized fluid in said piston chamber to move said piston, such that movement of the piston forces the housing against said collet.

5. The apparatus of 1 which said holding means further comprises a piston connected to said shaft, said holding means piston positioned in a piston chamber, said holding means piston being connected to said shaft for movement therewith, and regulating means for determining movement of said holding means piston and connected shaft.

6. The apparatus of claim 5 in which said regulating means includes a pressurized fluid in said holding means piston chamber and valve means for regulating said pressurized fluid in said holding means piston chamber.

7. The apparatus of claim 6 in which said holding means piston chamber includes a first portion on one side of said holding means piston, a second portion on another side of said holding means piston, and a first source of fluid pressure in communication with said first portion of said holding means piston chamber, and a second source of fluid pressure in communication with said second portion of said holding means piston chamber.

8. The apparatus of claim 7 in which said valve means includes venting means for selectively relieving the fluid pressure in said first and second portions of said holding means piston chamber.

9. The apparatus of claim 2 which additionally comprises a spindle connected to said housing.

10. The apparatus of claim 9 which additionally comprises a frame connected to said spindle and said platform in alignment with said axis.

11. The apparatus of claim 1 in which said platform is a turntable.

\* \* \* \* \*